(12) United States Patent
Gall

(10) Patent No.: US 6,480,862 B1
(45) Date of Patent: Nov. 12, 2002

(54) RELATION-BASED ORDERING OF OBJECTS IN AN OBJECT HEAP

(75) Inventor: Thomas Alan Gall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,123

(22) Filed: Apr. 23, 1999

(51) Int. Cl.$^7$ .............................................. G06F 17/30
(52) U.S. Cl. ........................ 707/103; 707/3; 707/205; 707/206
(58) Field of Search .................... 707/204, 205, 707/206, 103; 717/5, 3; 714/38; 711/165, 170, 171; 709/315

(56) References Cited

U.S. PATENT DOCUMENTS

| | | | | |
|---|---|---|---|---|
| 5,721,915 A | * | 2/1998 | Sockut et al. | 707/200 |
| 5,742,809 A | * | 4/1998 | Hayashi et al. | 707/100 |
| 5,778,378 A | * | 7/1998 | Rubin | 707/103 |
| 5,799,268 A | * | 8/1998 | Boguraev | 704/9 |
| 5,822,759 A | * | 10/1998 | Treynor | 711/134 |
| 5,845,287 A | * | 12/1998 | Henrion | 707/101 |
| 5,995,973 A | * | 11/1999 | Daudenarde | 707/103 |
| 6,026,412 A | * | 2/2000 | Sockut et al. | 707/200 |
| 6,038,566 A | * | 3/2000 | Tsai | 707/102 |
| 6,138,123 A | * | 10/2000 | Rathbun | 345/853 |
| 6,330,556 B1 | * | 12/2001 | Chilimbi et al. | 707/2 |

OTHER PUBLICATIONS

Trishul M. Chilimbi et al., Using Generational Garbage Collection To Implement Cache–Conscious Data Placement, 177 International Symposium on Memory Management (ISMM '98), vol. 34 (3) of ACM SIGPLAN Notices, (Oct. 1998).

James O'Toole et al., Concurrent Compacting Garbage Collection of a Persistent Heap, Proceedings of the 14th ACM Symposium of Operating Systems Principles, (Dec. 1993).

Scott Nettles et al., "Replication–Based Incremental Copying Collection", Research Document sponsored by The Avionics Lab, Wright Research and Development Center, Aeronautical Systems Division (AFSC), U.S. Air Force, Wright–Patterson AFB, OH under Contract F33615–90–C01465, Arpa Order No. 7597, and by the Air Force Systems Command and the Defense Advanced Research Projects Agency (DARPA) under Contract F19628–91–C–0128.

* cited by examiner

*Primary Examiner*—Jean M. Corrielus

(57) ABSTRACT

An apparatus, program product, and method organize data objects in an object heap based upon access relationships between the data objects (e.g., based upon temporal proximity and/or relative frequencies of access). By doing so, data objects that are accessed in close succession with one another are more likely to be located within the same page, and possibly within the same cache line, as one another. Consequently, when accessing such objects, the frequency of memory swapping within a multi-level memory architecture (e.g., within a particular cache memory, or within a virtual memory scheme, as appropriate for the particular architecture) is often reduced, resulting in an overall improvement in system performance.

30 Claims, 9 Drawing Sheets

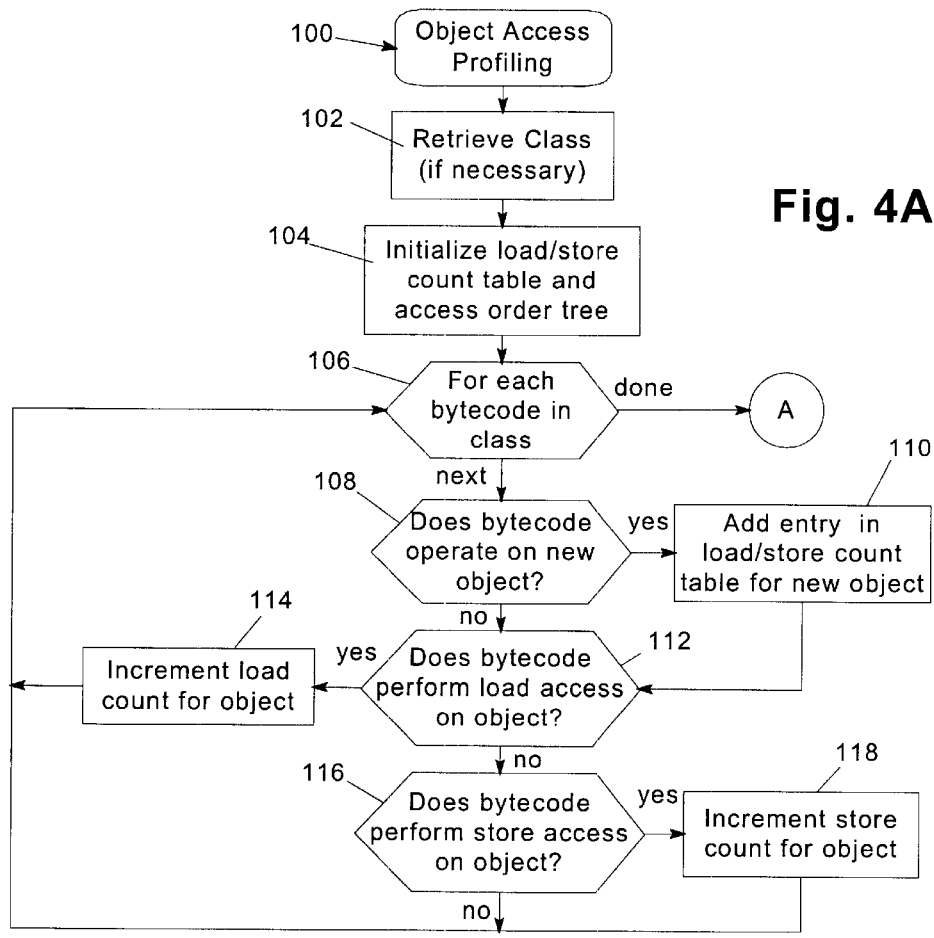
Fig. 4A
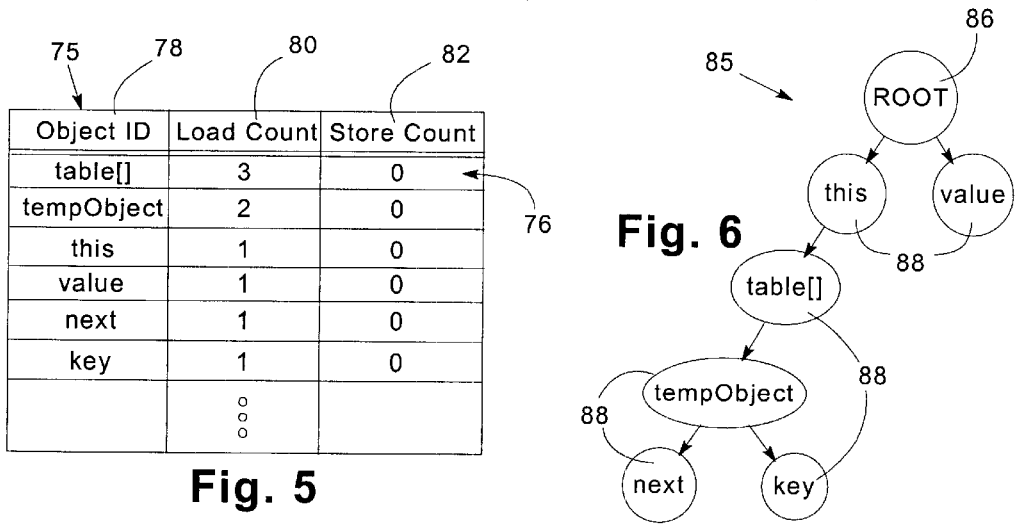
Fig. 5
Fig. 6

RELATION-BASED ORDERING OF OBJECTS IN AN OBJECT HEAP

FIELD OF THE INVENTION

The invention is generally related to computers and computer software. More specifically, the invention is generally related to the management of objects in an object heap.

BACKGROUND OF THE INVENTION

Managing available memory is critically important to the performance and reliability of a data processing system such as a computer. Specifically, data used by a computer program is typically stored in a computer within a memory that has a limited address space. In many computers, data is stored in the form of "objects" that are allocated space in a portion of the memory referred to as an "object heap". Objects also often include "references" (also known as pointers) to other objects so that a computer program can access information in one object by following a reference from another object. Typically each computer program has its own object heap, so if multiple computer programs are active in a computer, multiple object heaps may be maintained in the computer.

Whenever new data is to be used by a computer program, a portion of the free memory is reserved for that data using a process known as "allocating" memory. Given that the amount of memory available in a computer is limited, it is important to free up, or "deallocate", the memory reserved for data that is no longer being used by the computer. Otherwise, as available memory is used up, the performance of the computer typically decreases, or a system failure may occur.

A computer program known as a garbage collector is often used to free up unused memory that has been allocated by other computer programs in a computer. Often, a garbage collector executes concurrently with other computer programs to periodically scan through the object heap(s) and deallocate any memory that is allocated to unused objects (a process also known as "collecting" objects). Different computer programs that operate concurrently in a computer often include one or more "threads" that execute concurrently with one another. Moreover, when different computer programs use different object heaps, separate garbage collector computer programs, also referred to as collector threads, may be used to manage each object heap.

One specific type of garbage collector is a copying garbage collector, which manages an object heap by partitioning the object heap into "from-space" and "to-space" partitions, and copying valid and currently-used objects from the from-space to the to-space, in effect leaving unused objects behind. A specific implementation of a copying garbage collector is a generational garbage collector, which partitions an object heap into new and old partitions. A generational garbage collector relies on the tendency for newer objects to "die", or cease to be used, more frequently than older objects. Put another way, as an object is used over time, it becomes less and less likely that the object will cease being used.

A generational garbage collector manages an object heap by repeatedly scanning through newer objects in the new partition of the object heap, discarding and deallocating the memory for objects that are no longer in use, and moving objects that live beyond a threshold period of time into the old partition of the object heap. Given that older objects tend to be more stable, typically no scanning of the old partition of the object heap is required.

A generational garbage collector typically stores objects in the old partition of the object heap in a linear fashion—that is, one after another as each object is found to meet the criteria for being moved into the old partition. Likewise, objects in the new partition of the object heap are typically widely scattered throughout the new partition due to the deallocation and movement of objects by the garbage collector and the addition of new objects to then-available locations in the partitions.

As with generational garbage collectors, other copying garbage collector implementations also copy objects from a from-space to a to-space in a linear fashion. With the allocation and initial placement of objects in the from-space occurring by a process other than the garbage collector, however, objects tend to become widely scattered throughout the from-space with these copying garbage collector implementations as well.

An inherent result of the conventional manners of storing objects in an object heap is that the various objects used by a computer program can become widely dispersed throughout an object heap over time. Having a relatively wide dispersion of objects in an object heap, however, can result in sub-optimal performance for a computer due to memory swapping concerns.

Specifically, most computers rely on a multi-level memory architecture to balance memory performance with cost. Most computers include one or more levels of small capacity and high speed cache memory interfaced with a larger capacity but relatively slower main memory. As data is needed by a computer program, the data is copied from the main memory to a cache memory for access by a processor in the computer. Data is typically organized into blocks, or "cache lines", with all of the data allocated to a particular cache line swapped into and out of a cache as a group.

Some computers also implement a virtual memory scheme where the addressable memory space is larger than the physical storage available for the main memory. Similar to caching, in a virtual memory scheme data is organized into pages, and data is swapped page-by-page between main memory and an external storage device such as a direct access storage device (DASD).

The primary benefit of a multi-level memory architecture is that more frequently-used data can often be maintained in higher levels of memory so that the data can be accessed more quickly. Whenever data to be accessed from a cache memory is allocated to a cache line that is not currently stored in the cache memory, a cache miss occurs, and retrieval of the data takes longer since the data must be retrieved from a lower level of memory. Similarly, whenever data to be accessed from the main memory is allocated to a page that is not currently stored in the main memory, a page fault occurs, and retrieval of the data takes still longer since the data must be swapped in from external storage.

An object heap typically occupies multiple cache lines, and in many instances, multiple pages. Consequently, with a relatively wide dispersion of objects in an object heap, successive accesses to objects located in different locations in the object heap may require a substantial amount of memory swapping within each cache memory, and possibly within the main memory as well. As a result, accesses to the object heap tend to take longer, and the computer operates at less than peak efficiency.

Therefore, a substantial need exists in the art for a manner of improving the performance of a computer in accessing an object heap, particularly through improved garbage collection techniques.

SUMMARY OF THE INVENTION

The invention addresses these and other problems associated with the prior art by providing an apparatus, program product, and method that organize data objects in an object heap based upon access relationships between the data objects. By doing so, data objects that are accessed in close succession with one another are more likely to be located within the same page, and possibly within the same cache line, as one another. Consequently, when accessing such objects, the frequency of memory swapping within a multi-level memory architecture (e.g., within a particular cache memory, or within a virtual memory scheme, as appropriate for the particular architecture) is often reduced, resulting in an overall improvement in system performance.

An access relationship between two or more data objects may be based at least in part upon a likely temporal proximity of the accesses to such data objects, e.g., when a group of objects are typically accessed one after another during execution of a computer program. An access relationship between multiple data objects may also be based at least in part on the relative frequencies of access of different data objects. Other manners of defining an access relationship will become apparent to one of ordinary skill in the art upon reading the disclosure presented herein.

In one specific embodiment of the invention, the ordering of data objects in an object heap relies on profiled access information generated for different classes of data objects used by a computer program. The profiling may be performed at various times, including during compilation, loading, or execution of a computer program. Typically, information such as the number of accesses to data objects and/or the order in which data objects are accessed may be predicted and utilized in determining how to order data objects within an object heap.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 4A and 4B are flowcharts illustrating the program flow of the object access profiling routine of FIG. 3.

FIG. 5 is a block diagram of an exemplary load/store count table generated by the object access profiling routine of FIGS. 4A and 4B.

FIG. 6 is a block diagram of an exemplary access tree generated by the object access profiling routine of FIGS. 4A and 4B.

DETAILED DESCRIPTION

Hardware and Software Environment

Figure 1:
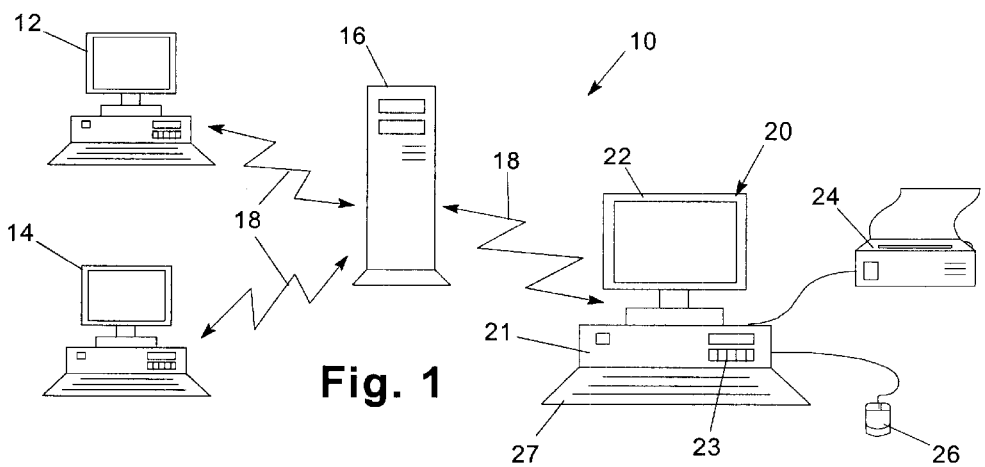
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
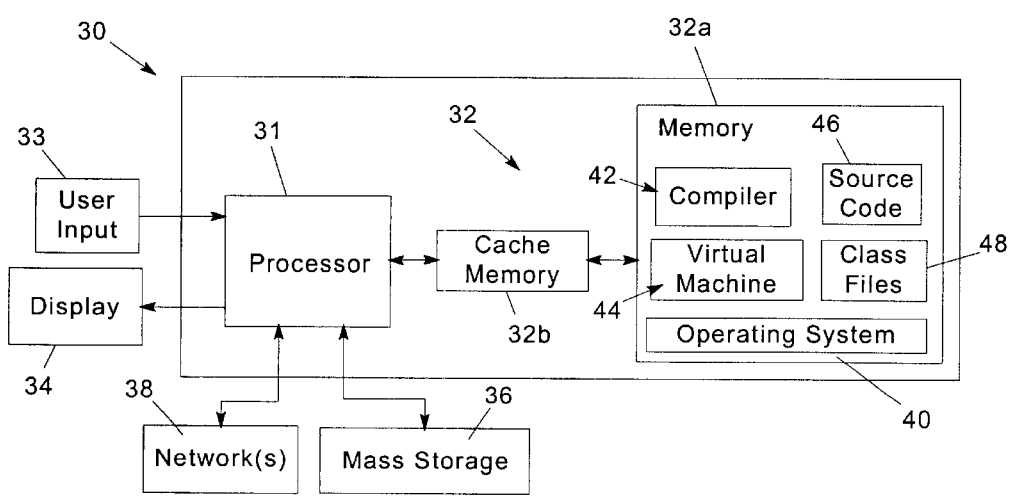
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may be implemented using any of a number of known multi-level memory architectures, e.g., including a main storage 32a implemented using random access memory (RAM) devices, and one or more supplemental levels of memory, e.g., one or more levels of cache memory 32b (whether external or internal to processor 31), as well as various non-volatile or backup memories (e.g., programmable or flash memories), read-only memories, etc. As is known in the art, data is swapped between main storage and cache memory, and/or between different levels of cache memory, in the form of "cache lines", with any access to data that is non-resident in a particular level of cache resulting in a "cache miss" and additional delay associated with retrieving the required data from another level of memory.

In addition, memory 32 may be considered to include memory storage physically located elsewhere in computer 30, e.g., (as discussed above) any cache memory or registers in processor 31, as well as any storage capacity used as a virtual memory, e.g., as stored on a mass storage device 36 or on another computer coupled to computer 30 via network 38. As is known in the art, with a virtual memory architecture, data is swapped between mass storage and main storage in the form of "pages", with any access to data that is non-resident in the main storage resulting in a "page fault" and additional delay associated with retrieving the required data from external storage.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., compiler 42, virtual machine 44, source code 46 and class files 48, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Relation-Based Object Ordering

The embodiments described herein generally operate by organizing data objects in an object heap based upon access relationships between the data objects. An object heap can include any segment of a computer memory that represents the working memory for a computer program, typically any segment of memory in which data is dynamically allocated, used and managed during execution of a computer program. Typically, but not necessarily, an object heap is managed by a garbage collector, which may run concurrently with a computer program, or which may operate as a "stop-the-world" collector that halts execution of a computer program, or simply a specific thread of the program, whenever garbage collection is performed. Various types of garbage collectors, which are generally known in the art, may be used consistent with the invention.

An access relationship as described herein typically exists between two or more data objects based at least in part upon a likely temporal proximity of the accesses to such data objects and/or based at least in part on the relative frequencies of access of different data objects. For example, an access relationship may be defined whenever a parent-child relationship exists between two objects, i.e., whenever one object (the parent) accesses some portion of the other object's (the child's) memory. Children in turn may also, have their own relationships where they are the parent—even of other objects that are themselves parents of those children. By organizing objects in the manner described herein, cache misses and/or page faults in a multi-level memory architecture are reduced, as the likelihood is increased that objects that are accessed within a short time frame will be within the same organizational block in memory (e.g., a cache line or virtual memory page, as appropriate).

In certain embodiments discussed hereinafter, multiple data objects that fall within the same access chains—that is, objects that are referenced in various sequences after a particular root object is accessed—can logically be grouped together in memory (e.g., within a continuous memory segment in an object heap) based upon the temporal proximity between the objects in such a group. Moreover, in certain embodiments, the specific objects within such a group may be arranged relative to one another based upon relative access frequencies and/or the order in which the objects are accessed.

The specific embodiment described hereinafter focus on a particular application of the invention in optimizing the performance of computer programs executed in the Java programming environment developed by Sun Microsystems. However, it should be appreciated that the invention may have applicability in other object-oriented programming environments that utilize an object heap. Moreover, given that all data (even when not referred to as an "object" in an object-oriented sense) can be represented as an object, the invention may also have applicability in non-object-oriented programming environments as well. Thus, the invention is not limited to the specific Java-based implementation described hereinafter.

Figure 3:
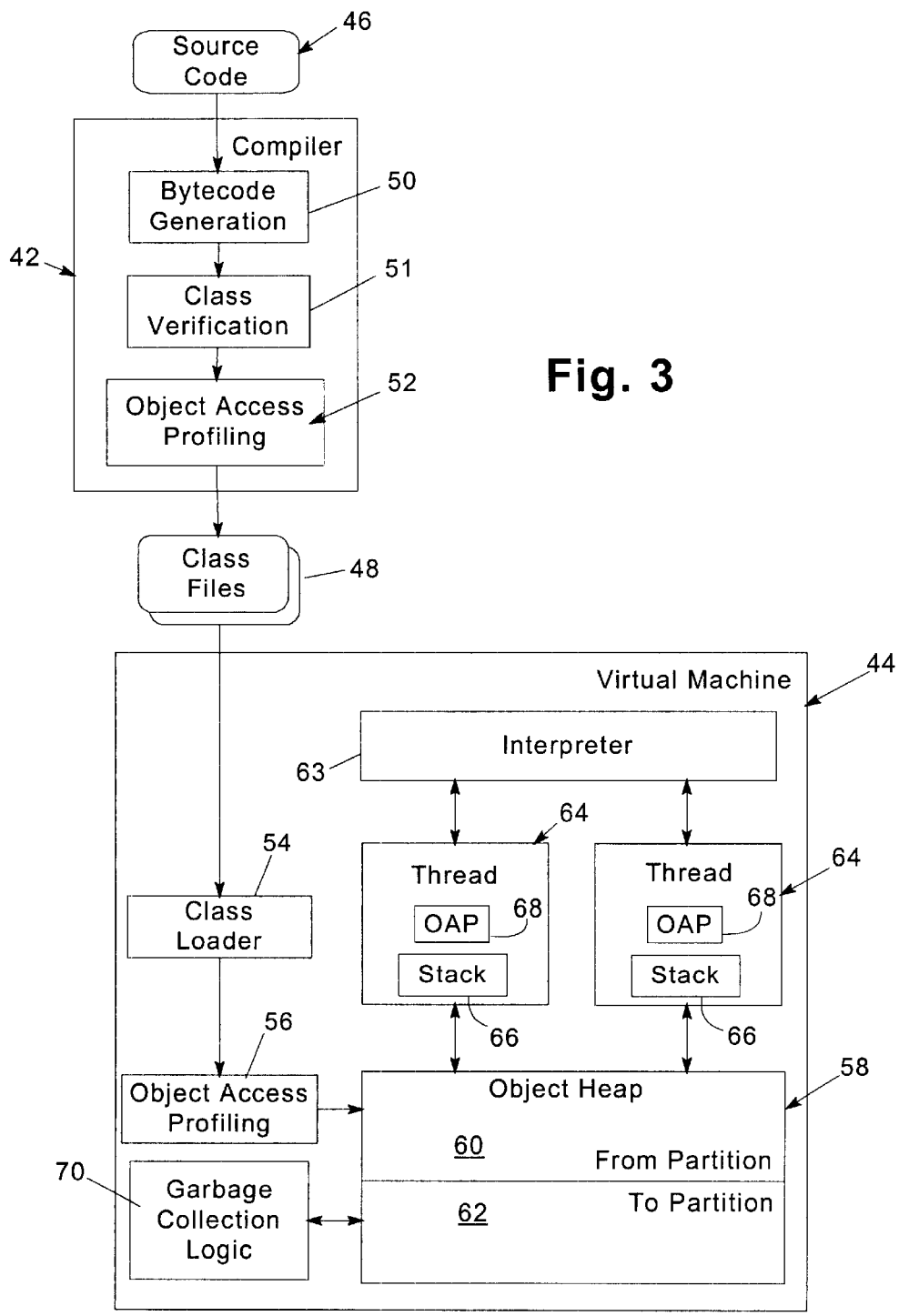
FIG. 3 is a block diagram of the software components in the environment of FIG. 2.

FIG. 3 illustrates the primary software components utilized in the illustrated embodiment to implement relation-based object ordering consistent with the invention. Specifically, FIG. 3 shows a compiler 42 coupled to a virtual machine 44, with the compiler receiving as input source code 46 and outputting in response thereto one or more class files 48 capable of being executed by virtual machine 44.

Each of components 42–48 is configured to be compatible with the various known Java language specifications. Source code 46 is a human-readable Java source code representation of a computer program. Compiler 42 is utilized to generate from the Java source code 46 a plurality of bytecodes that represent an intermediate representation of a Java computer program, as illustrated at block 50.

The generated bytecodes are organized into one or more classes, representing the templates for the objects that are to be allocated and utilized during execution of the computer program by virtual machine 44. The classes are organized into class files containing both the executable bytecodes and data relied upon by such executable code. Other information about an object is also typically included within the class file, as is known in the art.

Once generated, the classes are processed by a class verification block 51, which performs various verification and analysis operations on the classes to ensure that the classes are error free and will not cause various run-time errors, as well as that all security requirements of the Java language are met. It should be appreciated that both bytecode generation and class verification are well known, and thus need not be discussed in any further detail herein.

Once verified, the classes are passed to an object access profiling block 52 to perform access profiling in a manner consistent with the invention. Specifically, access patterns for the classes are generated based upon simulation of the executable code defined within the classes (discussed in greater detail below with respect to FIGS. 4A and 4B). The output of block 52 is one or more class files 48. As discussed in greater detail below, such class files may include profiled access information embedded therein, although in some embodiments, such information may not be stored in the class files, whereby object access profiling in block 52 would not be performed.

Once generated, class files may be distributed to third parties and/or stored to some persistent medium for later execution, or may be immediately executed by virtual machine 44. Virtual machine 44 implements a Java Virtual Machine (JVM), which essentially emulates the operation of a hypothetical microprocessor on a specific computer platform. Different virtual machines may be utilized to permit the class files to be executed on different platforms. Moreover, it should be appreciated that compiler 42 and virtual machine need not reside on the same computer system.

Class files are loaded by virtual machine 44 using a class loader component 54, in a manner generally known in the art. Component 54 in the illustrated embodiment, however, is also capable of passing the loaded class files to an object access profiling block 56 to obtain profiled access information about the class files if no such information was embedded in the class files by the compiler. In addition, class loader 54 may also perform additional class verification to verify that Java security rules are met, in a manner also known in the art.

To provide working storage during execution of the computer program, virtual machine 44 includes an object heap 58 including a "From" partition 60 and a "To" partition 62. Data storage is allocated during runtime in From partition 60 for use as working storage. Then, a garbage collector (represented by garbage collection logic 70) periodically copies reachable objects from partition 60 to To partition 62 and swaps the From and To partitions so that the previous To partition becomes the new From partition, and vice versa. Such an object heap management algorithm is known as copying-type garbage collection. However, as other object heap management algorithms may be used, other object heap organizations may be utilized as well.

In response to the loading of classes by class loader 54, one or more threads 64 are executed by an interpreter 63 that generates for each bytecode suitable native code appropriate for the platform upon which the virtual machine executes. Each thread has allocated therefor a call stack 66 upon which data necessary for maintaining coherence through different method calls is maintained. In addition, as shown at 68, additional object access profiling may be performed during run time, if necessary. The object heap is managed by garbage collection logic 70, which in the illustrated implementation is a copying-type garbage collector.

As shown in FIG. 3, each thread shares an object heap managed by a single garbage collector thread. Multiple computer programs executing simultaneously on the same computer system may also share the same object heap. In the illustrated embodiment, however, additional computer programs are allocated separate object heaps (and associated garbage collectors), but are not shown in the figure.

It will be appreciated that the interpretation and execution of Java bytecodes by virtual machine 44 are operations that are well known in the art. Additional modifications to the virtual machine, including just-in-time compilation, among other alternatives, may also be implemented in virtual machine 44.

As discussed above, object access profiling consistent with the invention may be performed at various times in the life of a computer program, e.g., during compilation (represented at block 52), during loading (as illustrated by block 56), and/or during execution (as illustrated at block 68). It should be appreciated that typically profiling will be performed at only one such time period, although it may be necessary to check to see that object access profiling has been performed and that suitable access information has been generated, e.g., during class loading if it is anticipated that the virtual machine may execute class files that have been generated by other systems not having access to object access profiling during compilation. Generally, it is preferable to perform profiling as early in the process as possible, e.g., during compilation, or during loading, to minimize any performance penalties during execution of a computer program.

Figure 4B:
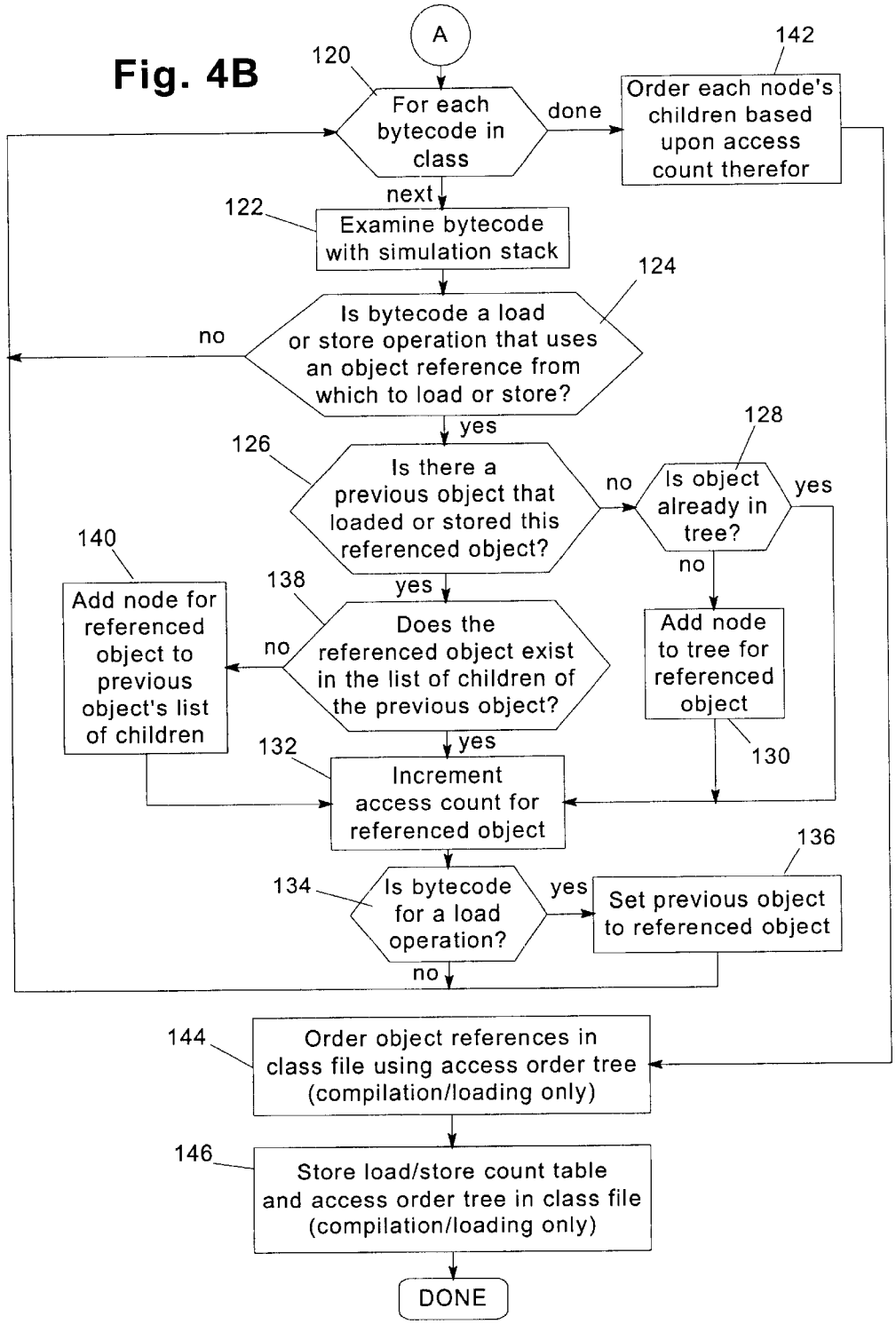

One suitable routine for performing object access profiling consistent with the invention is illustrated at 100 in FIGS. 4A and 4B. As shown in FIG. 4A, routine 100 begins in block 102 by retrieving the class, if necessary. As discussed above, object access profiling may be performed after a class has already been loaded and/or during execution of the program code stored in the class file. In such instances retrieval of the class may not be necessary.

Next, in block 104, a load/store count table and an access order tree data structure are initialized. The load/store count table is utilized to maintain counts of the predicted accesses to each object referenced in a class, separated by load accesses and store accesses. For example, as shown in FIG. 5, one suitable data structure for the load/store count table is illustrated at 75, including a plurality of entries 76, each including an object ID field 78, a load count field 80, and a store count field 82. Object ID field 78 includes any unique identifier from which a referenced object can be identified. Load count field 80 stores the number of load-type accesses (e.g., aload and get field operations in Java), and store count field 82 likewise stores a number of store-type accesses (e.g., astore and put field operations in Java), based upon profiling information. Typically, the table 75 is initialized with the data in all entries cleared.

It should be appreciated that other data structures may be utilized to represent the number of load and store accesses for a given class, including linked lists and hash tables, among others. Moreover, it should be appreciated that in some embodiments it ay not be necessary to maintain separate counts for load and store accesses, whereby the load and store count fields 80, 82 can be combined into the same field. Moreover, as will be discussed in greater detail below, the access information for certain objects may be maintained within the access order tree data structure, whereby table 75, or any equivalent data structure, would not be required.

FIG. 6 illustrates one exemplary access order tree data structure 85, including a root node or object 86 from which a plurality of nodes 88 depend therefrom. Root node 86 represent the starting point for the tree under which all objects referenced by a particular method. Nodes 88 generally represent the fields, or referenced objects, within a particular method that is represented by root 86. Note that some of nodes 88 can be referenced by other nodes 88, representing a chain of referenced objects. For example, for the "this" object of the exemplary class represented in tree 85, a call or access chain from the "this" object to a "table☐" object, a "tempObject" object and then a "next" object is illustrated, which represents that, during execution of an object defined by the exemplary class, objects "table☐", "tempObject" and "next" are referenced in order immediately subsequent to a reference to the "this" object.

Within each node may be stored simply the object identifier for the object in the call chain. In other embodiments, it may also be desirable to include within each node an access count representing the number of accesses to that object. Such access counts may be segregated by load and stores, or may be grouped together. As discussed above, this information may be stored in the nodes as an alternative to using a separate access table.

Moreover, each tree is typically segregated by the objects referenced by each method defined for that class. It may be desirable in such instances, for example, to insert an additional node between root node 86 and each field node 88 such that the field nodes may be classified by method. It should also be appreciated that various data structures, e.g., linked lists and the like, may be used to represent a call tree consistent with the invention. Typically, initialization of an access order tree includes initializing a root node object, having no children nodes associated therewith.

Returning now to FIG. 4A, once the load/store count table and access order tree have been initialized, control passes to block 106 to enter a loop within which each bytecode in the class is analyzed to build the load/store count table. Specifically, for each bytecode in the class, control passes to block 108 to determine whether the bytecode operates on a new object—that is, whether the bytecode references an object that does not have a corresponding entry in the load/store count table. If so, control passes to block 110 to add a new entry in the load/store count table for the new object, including storing the object identifier in the new entry and initializing the load and store counts to zero. Control then passes to block 112 to determine whether the bytecode performs a load access on the object. Also, returning to block 108, if the bytecode does not operate on a new object, control passes directly to block 112, bypassing block 110.

If the bytecode does perform a load-type access on the object, control passes to block 114 to increment the load count for that object—that is, the value stored in the load count field of the entry corresponding to the object is advanced by one. Control then returns to block 106 to process additional bytecodes.

Returning to block 112, if the bytecode does not perform a load access on the object, control passes to block 116 to determine whether the bytecode performs a store-type access on the object. If not, no further processing of the bytecode need occur, and control returns to block 106. If, however, the bytecode does perform a store access on the object, control passes to block 118 to increment the store count for that object, prior to returning control to block 106.

Once all bytecodes in the class have been processed, block 106 passes control to block 120, shown in FIG. 4B. Block 120 initiates a second loop in which each bytecode in the class is processed to build the access order tree for the class.

For each bytecode, control passes to block 122 to examine the bytecode using a simulation stack. Specifically, the effects the execution of the bytecode are simulated to build a "simulated" call stack.

Once the bytecode is examined with the simulation stack, control passes to block 124 to determine whether the bytecode is a load or store operation that uses an object reference from which to load or store—that is, whether the bytecode accesses another object, referred to herein as a "referenced object" to perform a load or store operation. If not, control returns to block 120 to process additional bytecodes.

If, however, the bytecode is a load or store operation that uses an object reference, control passes to block 126 to determine whether a previous object exists that loaded or stored this referenced object. The previous object as used herein represents an object that was previously accessed to reach the access to the referenced object in question. As such, a call or access chain is defined between the previous object (if such exists) and the referenced object.

First, assuming that no previous object yet exists for the referenced object, control passes to block 128 to determine whether the referenced object is already in the access order tree. If not, a new node is added to the tree for the referenced object, and control passes to block 132 to increment an access count for the referenced object. Returning to block 128, if the object is already in the tree, no new node is added, and control passes directly to block 132 to increment the access count therefor.

As discussed above, the access count may be maintained within each node of the tree. In the alternative, the access count information may be maintained in the load/store count table, whereby block 132 would not be required.

After the access count is incremented for the referenced object, control passes to block 134 to determine whether the bytecode is a load operation. If not, control returns to block 120 to process additional bytecodes. If, however, the bytecode is a load operation, control passes first to block 136 to set the previous object to the referenced object, essentially traversing down the tree one level to set the referenced object as the previous object for any subsequent load or store operations. Control then returns to block 120 to process additional bytecodes.

Now returning to block 126, if a previous object exists for the load or store operation, control passes to block 138 to determine whether the referenced object exists in the list of children for the previous object. If so, control passes directly to block 132 to increment the access count for the referenced object. If, however, the referenced object does not exist in the list of children, control first passes to block 140 to add a node for the referenced object to the previous object's list of children, indicating that the referenced object has an access relationship with the previous object by virtue of its being accessed immediately subsequent to an access to the previous object.

Once all bytecodes have been processed for the class, an access order tree data structure is constructed for the class, from which it can be ascertained what objects are accessed in what order in the class. Control then passes from block 120 to block 142 to order each node's children based upon the access counts therefor. Specifically, for each node, the children therefor are ordered in the access tree based upon the access counts stored in each of those nodes, with the child having the highest access count placed first, and with other children following in descending order of access count. This secondary level of ordering therefore organizes child nodes that are accessed more frequently closer to the parent node to ensure that the more frequently-traversed call or access chains are stored as close as possible to one another.

Once each node's children are organized in the manner described above, control passes to blocks 144 and 146 to optionally store the recently-generated profiled access information in the class file for later use during run time. It should be appreciated, however, that if object access profiling is being performed at run-time, it may not be necessary to order the objects in the class file or store the access information within the class file. As such, in these circumstances, blocks 144 and 146 may be omitted.

In block 144, the object references in the class file are ordered according to the access order tree, therefore utilizing the access information that is inherent in the tree, whereby the references to objects that are accessed in particular chains or sequences (i.e., with temporal proximity) are ordered close to one another to form groups, with the references to objects within such groups (e.g., sibling objects depending from the same parent object) further ordered by relative access frequency. It should be appreciated that this type of ordering may be performed simply by traversing through the tree through an algorithm that recursively selects the next node to be stored in the class as the left-most unprocessed child for a currently-processed node, then backing up to a parent node when all child nodes have been processed.

Consequently, using the above-described algorithm, the class file itself is organized in such a manner that references to related objects are located closer to one another. As a result, subsequent loading of a class file optimized in this manner into the object heap during runtime also has the capability to reduce cache misses and/or page faults within the From partition of the object heap, independent of any gains associated with improved garbage collection.

Once the object references in the class have been ordered in block 144, control passes to block 146 to store the load/store count table and access order tree in the class file. Profiling is then complete, and routine 100 terminates.

Figure 7:
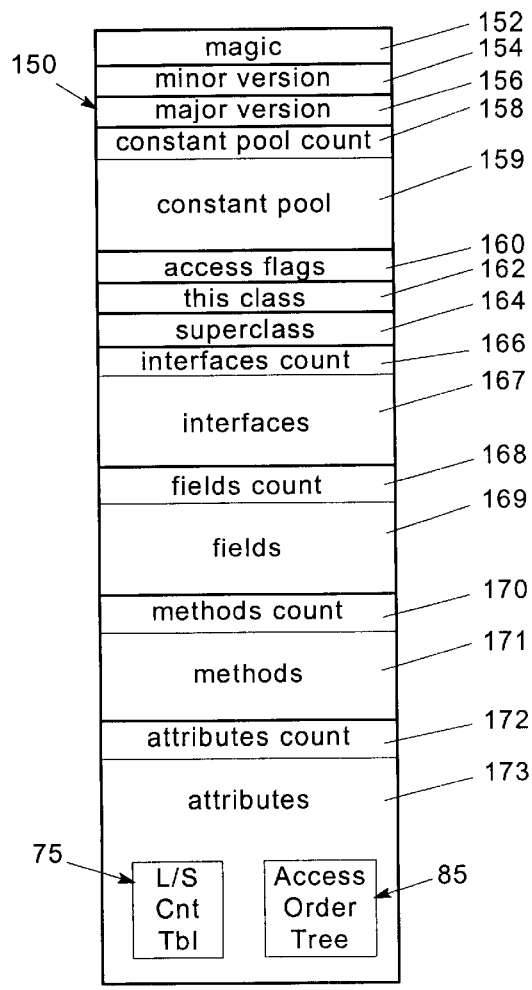
FIG. 7 is a block diagram of an exemplary Java class file.

FIG. 7 is a diagram of an exemplary Java class file 150 output by compiler 42 of FIG. 3, and including the profiled access information generated by routine 100 of FIGS. 4A and 4B. Class file 150 is the standard external representation of a Java class that enables the "portability" of Java—its ability to run on any system with a conforming Java virtual machine (JVM), regardless of the underlying architecture of the platform supporting the JVM. Class file 150 includes a number of data fields 152–173. "Magic" data field 152 is a particular arbitrary bit sequence that allows the file to be identified as a Java class file. The bit sequence must have the hexadecimal value 0xCAFEBABE to allow the file to be recognized as a Java class file. Also, "minor version" and "major version" data fields 154 and 156 identify the version of the class file.

"Constant pool" data field 159 defines a list of entries of varying lengths, with the size of the constant pool identified by "constant pool count" data field 158. Each entry represents a constant or external reference used elsewhere in the class file. The use of the constant pool allows a single occurrence of a value to serve multiple needs within the class file.

"Access flags" data field 160 defines some of the basic characteristics of the class represented by the class file, including the authority required to reference the class from other classes. "This class" data field 162 is an index into the constant pool of the entry that contains the name of this class, and "superclass" data field 164 is an index into the constant pool of the entry that contains the name of the superclass of this class.

"Interfaces" data field 167 defines a list of constant pool index values that identify the names of interfaces which this class implements, with the size thereof identified by "interfaces count" data field 166. Interfaces are used in Java to achieve some of the same functions that "multiple inheritance" provides in other object-oriented languages.

"Fields" data field 169 defines a list of entries of varying length which describe the fields of this class, with the size thereof identified by "fields count" data field 168. The names of the fields and, where present, their initialization values are represented as indexes into the constant pool.

"Methods" data field 171 defines a list of entries of varying length which describe the methods of this class, with the size thereof identified by "methods count" data field 170. The names of the fields are represented as indexes into the constant pool. The actual interpretable code (i.e., the set of bytecodes) for each method is appended to the end of its method entry.

"Attributes" data field 173 defines a repository for other characteristics of the class, with the size thereof identified by "attributes count" data field 172.

The references to the objects referenced by the class are stored in fields data field 169, and it is within this data field that the references are organized in the manner described above with respect to block 144 of FIG. 4B. The profiled access information for the class is typically stored within the attributes field 173 of the class file, as represented by the placement of table 75 and access order tree 85 in FIG. 7.

Figure 8:
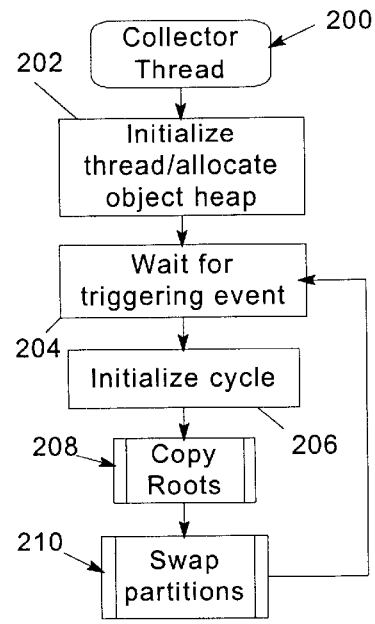
FIG. 8 is a flowchart illustrating the program flow of a collector thread executed by the garbage collection logic of FIG. 3.

FIG. 8 illustrates a collector thread 200 executed by the garbage collection logic 70 (FIG. 3). Generally, the collector thread is initialized in block 202, which typically includes the allocation of the object heap in memory. Next, in block 204, the collector thread waits for a triggering event, e.g., expiration of a timer, a reduction in the available memory below a predetermined threshold, etc., as is well known in the garbage collection art.

Once the triggering event occurs, the collection cycle is initialized in block 206. Next, a copy roots routine 208 is executed to copy all reachable objects from the From partition of the object heap into the To partition thereof. Next, a swap partitions routine 210 is executed to swap the To and From partitions so that the objects copied to the To partition are in essence "returned" to the From partition. As a result, any objects not copied into the To partition in routine 208 will effectively be discarded on the next garbage collection cycle as new objects are copied into the previous From partition.

Figure 9A:
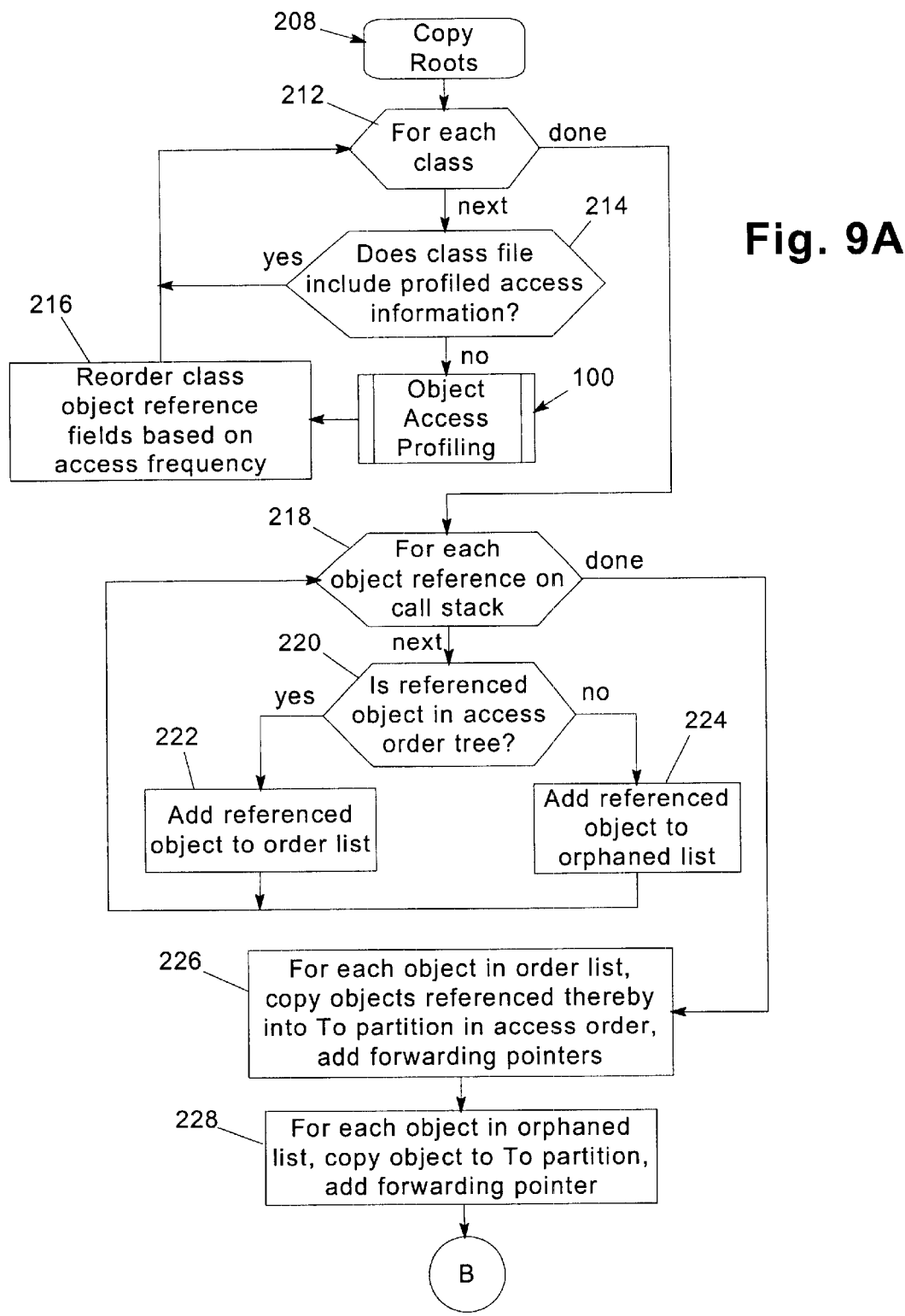
FIGS. 9A and 9B are flowcharts illustrating the program flow of the copy roots routine referenced in FIG. 8.
Figure 9B:
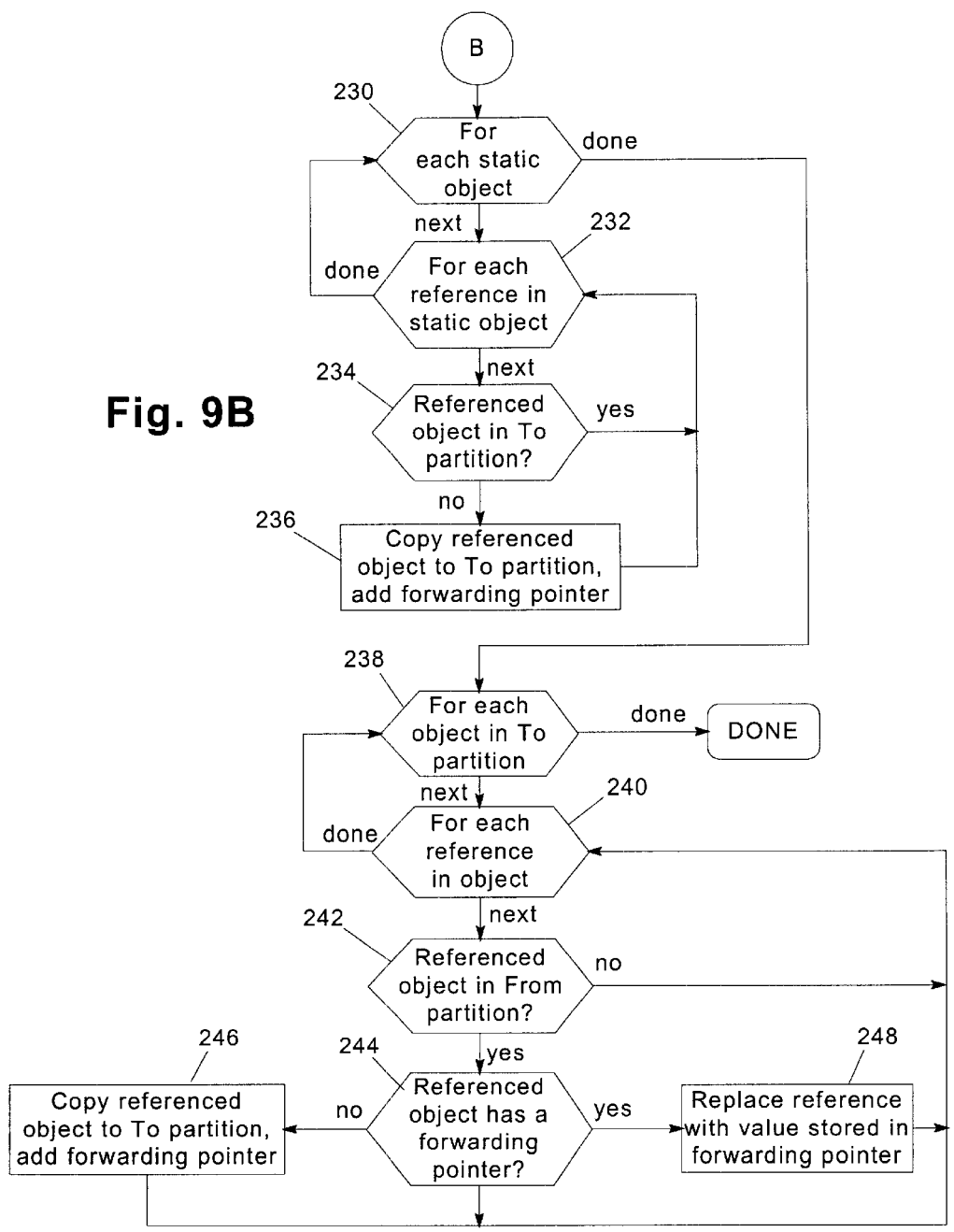

FIGS. 9A and 9B next illustrate the operation of copy roots routine 208 in implementing relation-based object ordering in a manner consistent with the invention. As shown in FIG. 9A, routine 208 begins in block 212 by initiating a loop to ensure that profiled accessed information is available for each class in the computer program utilizing the object heap. For each such class, control passes from block 212 to block 214 to determine whether the class file includes the profiled access information generated above in routine 100. If so, no further processing of the class need occur, and control returns to block 212 to process additional classes.

If, however, no such access information is available, object access profiling routine 100 is called for that class, and subsequently block 216 reorders the class object reference fields based upon relative access frequency. Control then returns to block 212 to process additional classes.

Once all classes have been processed, profiled access information for each class is available to the garbage collector. Control then passes to block 218 to initiate a loop to process the object references currently disposed on the call stack. As discussed above, the call stack typically includes references to objects that are utilized during the execution of more or more methods in a computer program. Whenever a method is called by a computer program, the parameters to be used by that method are passed to that method by pushing an entry onto the call stack including such parameters. In addition, return information about the calling method is added to the entry so that the program can resume once the called method is terminated. Whenever a called method terminates or completes, the entry therefor is popped from the call stack, and the information returned to the calling method. The use and operation of a call stack is well known in the art.

Block 218 specifically initiates a FOR loop to sort each object reference currently on the call stack into one of two lists, an "order" list containing all objects that are found in call or access chains, and an "orphaned" lists for all other objects. Thus, for each such reference, control passes to block 220 to determine whether the referenced object for that object reference is in the access order tree for that class. If so, control passes to block 222 to add the referenced object to the "order" list. If not, the referenced object is added to the "orphaned" list in block 224. Once all objects have been processed in this manner, block 218 passes control to block 226 and 228 to separately handle the objects in each list.

Block 226 handles the objects in the "order" list, essentially copying the objects referenced by each object in the "order" list into the To partition in the access order defined by the access order tree. In addition, at this time, a forwarding pointer is added to each original object in the From partition, which points to the new copy of that object in the To partition. Consequently, any references to the old copy of the object in the From partition are able to locate the new copy of the object simply by following the forwarding pointer therefor.

For the objects in the "orphaned" list, block 228 copies each object to the To partition, also adding a forwarding pointer to the original copy of the object in the From partition. Since the objects in the "orphaned" list are not present on the access order tree, no particular organization of such objects is used.

Upon completion of blocks 226 and 228, processing of the object references on the call stack is complete, and control passes to block 230 of FIG. 9B to initiate a loop for processing all static objects in the object heap. As is known in the art, a static object is typically an object that is globally accessible.

Block 230 initiates a loop to process each static object. For each such object, control passes to block 232 to process each reference in that static object. For each such reference, control passes to block 234 to determine whether the object referenced by that reference has already been copied to the To partition. If so, control returns to block 232 to process additional references in the static object. If, however, the referenced object is not in the To partition, control passes to block 236 to copy the referenced object to the To partition, and to add a forwarding pointer to the original copy in the From partition that points to the new copy in the To partition. Control then returns to block 232 to process additional references.

Once every reference in the current static object has been processed block 232 returns control to block 230 to process additional static objects in the manner described above. Then, once all static objects have been processed, block 230 then passes control to block 238 to ensure all objects that are referenced by reachable objects in the To partition are also copied over to the To partition.

Specifically, block 238 processes each object in the To partition by passing control to block 240 to process each reference in the object. For each such reference, control passes to 242 to determine whether the referenced object is in the From partition. If it is not, control returns to block 240 to process additional references in the currently-processed object. However, if the referenced object is still in the From partition, control passes to block 244 to determine whether the referenced object currently has a forwarding pointer.

If not, the referenced object has not yet been copied to the To partition, and thus block 246 is executed to copy the referenced object to the To partition and to add a forwarding pointer to the original copy in the From partition. Control then returns to block 240 to process additional references in the object.

If, however, the referenced object does have a forwarding pointer, the referenced object has already been copied to the To partition, and as such, block 248 is executed to replace the reference in the currently-processed object with the value stored in the forwarding pointer. In essence, this operation updates the reference to point to the new copy of the object in the To partition. Control then returns to block 240 to process additional references in the object.

Once all references in the currently-processed object have been processed, block 240 passes control to block 238 to process additional objects in the To partition. Moreover, once all such objects in the To partition have been copied, the copying phase of the garbage collection cycle is complete, and routine 200 terminates.

Figure 10:
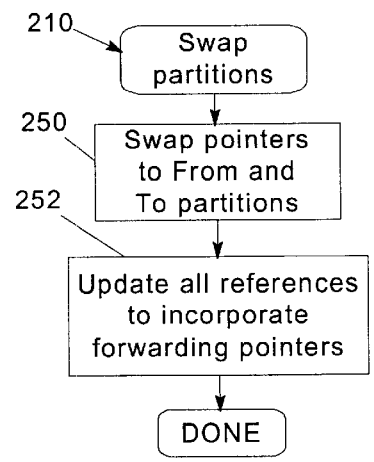
FIG. 10 is a flowchart illustrating the program flow of the swap partitions routine referenced in FIG. 8.

FIG. 10 next illustrates swap partitions routine 210 in greater detail. As discussed above, upon completion of the copy roots routine, all reachable objects in the object heap have been copied to the To partition. Thus, routine 210 first executes block 250 to swap the pointers to the From and To partitions, essentially returning all of the reachable objects into a newly-formed From partition for use during the next cycle of the collector thread. All objects that are not reachable, as well as the original copies of the reachable objects (which still include forwarding pointers to the new copies thereof), remain in the space now allocated to the new To partition. While the new To partition can be cleared if desired, typically this step is omitted since the next cycle of the collector thread will simply overwrite any information still remaining in that partition.

Once the pointers have been swapped in block 250, control passes to block 252 to update all references to incorporate forwarding pointers. Specifically, all references that point to objects having forwarding pointers are updated to store the values associated with those forwarding pointers, essentially updating the references to point to the new copies in the space now allocated to the From partition. Upon completion of block 252, the object heap has been collected, and the current cycle of the collector thread is complete. Thus, as shown in FIG. 8, control returns to block 204 to wait for a triggering event for the next cycle of the collector thread.

Illustrative Example

To illustrate the operation of the specific embodiment described above, Table I below illustrates a representative Java language method "containsKey", provided as a component of a class entitled "Hashtable", and having a plurality of "HashtableElement" objects:

TABLE 1 containsKey() Method Source Code

```
public synchronized boolean containsKey(Object key) {
    HashtableElement tab[] = table;
    int hash = key.hashCode();
    int index = (hash & 0x7FFFFFFF) % tab.length;
    for (HashtableElement e = tab[index]; e != null; e = e.next) {
        if ((e.hash == hash) && e.key.equals(key)) {
            return true;
        }
    }
    return false;
}
```

Table II below in turn illustrates representative bytecodes generated during compilation of the method illustrated in Table I:

TABLE II containsKey() Method Object Code

| Offset | Bytecode |
|---|---|
| 0 | aload_0 |
| 1 | getfield #55 <Field java.util.HashtableElement table[]> |
| 4 | astore_2 |
| 5 | aload_1 |
| 6 | invokevirtual #44 <Method int hashCode()> |

TABLE II-continued containsKey() Method Object Code

| Offset | Bytecode |
|---|---|
| 9 | istore_3 |
| 10 | iload_3 |
| 11 | ldc #2 <Integer 2147483647> |
| 13 | iand |
| 14 | aload_2 |
| 15 | arraylength |
| 16 | irem |
| 17 | istore 4 |
| 19 | aload_2 |
| 20 | iload 4 |
| 22 | aaload |
| 23 | astore 5 |
| 25 | goto 58 |
| 28 | aload 5 |
| 30 | getfield #43 <Field int hash> |
| 33 | iload_3 |
| 34 | if_icmpne 51 |
| 37 | aload 5 |
| 39 | getfield #45 <Field java.lang.Objeet key> |
| 42 | aload_1 |
| 43 | invokevirtual #42 <Method boolean equals(java.lang.Object)> |
| 46 | ifeq 51 |
| 49 | iconst_1 |
| 50 | ireturn |
| 51 | aload5 |
| 53 | getfield #48 <Field java.util.HashtableElement next> |
| 56 | astore 5 |
| 58 | aload 5 |
| 60 | ifnonnull 28 |
| 63 | iconst_0 |
| 64 | ireturn |

Based upon the above object code, execution of routine 100 of FIGS. 4A and 4B would create a load store table such as table 75 of FIG. 5, including the data shown therein that indicates that the "table☐" object is referenced three times (at bytecode offsets 1, 14 and 19), the "tempObject" object is referenced twice (at bytecode offsets 28 and 51), and the "this", "value", "next", and "key" objects are each referenced once (respectively at bytecode offsets 0, 5, 53 and 39). Similarly, routine 100 would create an access order tree such as tree 85 of FIG. 6, indicating the relative access order of the various objects referenced in the method.

Figure 11:
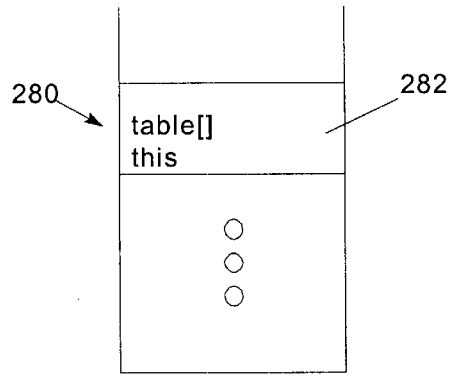
FIG. 11 is a flowchart illustrating an exemplary call stack occurring during execution of the collector thread of FIG. 8.
Figure 12A:
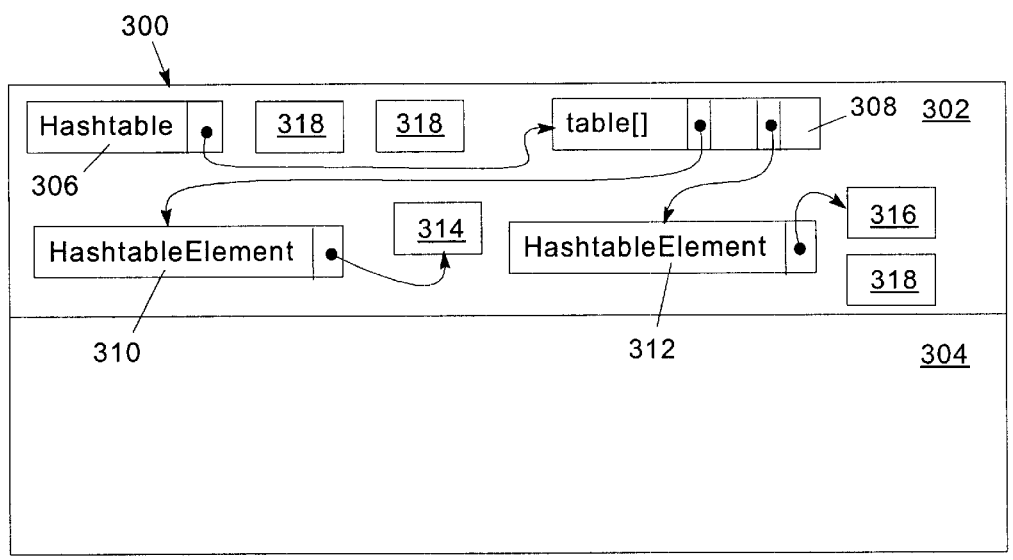
FIGS. 12A–12C are block diagrams of an exemplary object heap operated upon by the collector thread of FIG. 8.
Figure 12B:
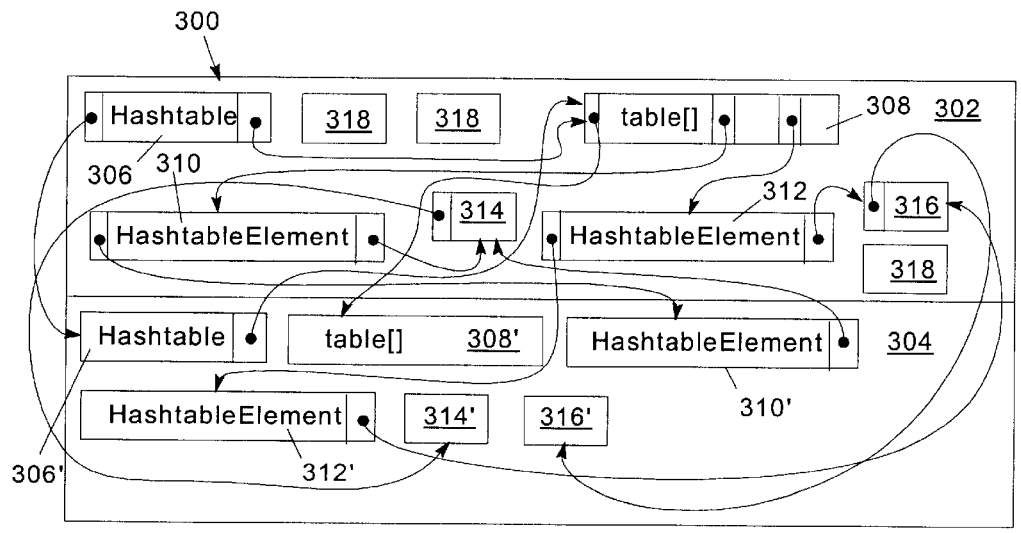
Figure 12C:
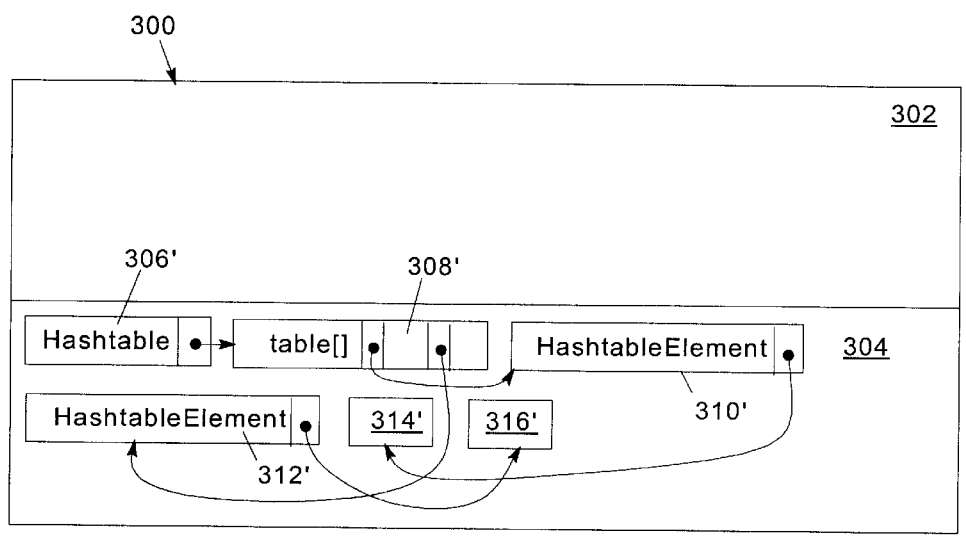

Now turning to FIGS. 12A–12C, a representative garbage collection operation performed on an exemplary object heap 300, including a From partition 302 and a To partition 304, is illustrated. FIG. 12A in particular illustrates the state of From partition 302 prior to garbage collection, when the call stack of one of the threads in the Java virtual machine during the garbage collection cycle is pausing or has the containsKey method on the stack, e.g., as represented by an entry 282 on a call stack 280 in FIG. 11. For this example, "Hashtable" and "table☐" objects are on the stack as of the initiation of the garbage collection operation.

As shown in FIG. 12A, based upon the order in which the objects are allocated, the From partition may have a "Hashtable" object 306, a "table☐" object 308, a pair of "HashtableElement" objects 310, 312, and a pair of objects 314, 316 referenced by the "HashtableElement" objects. As is further shown in FIG. 12A, these objects may be widely dispersed within From partition 302, with additional objects, represented at 318, interspersed therebetween.

Now turning to FIG. 12B, the result of copying the objects from From partition 302 to To partition 304 (starting at block 218 of FIG. 9A) is illustrated, whereby copies (denoted by primes) are made of the "Hashtable" object 306, "table☐"

object 308, "HashtableElement" objects 310, 312, and objects 314, 316. The object copies are packed together in the To partition, and the copy order is based on breadth first ordering (depth first ordering may also be used). It should be noted that forwarding pointers are added to the objects in the From partition to maintain the references to the copies in the To partition. Also, orphaned objects, represented at 318, are not copied into the To partition, and are therefore discarded when the partitions are swapped.

Next, as shown in FIG. 12C, the references contained within the objects are cleaned up as discussed above in connection with FIG. 9B, specifically starting with block 238 of routine 208. Upon swapping of the partitions, To partition 304 then becomes the From partition for the next garbage collection cycle.

Additional modifications may be made to the illustrated embodiments without departing from the spirit and scope of the invention. The invention therefore lies in the claims hereinafter appended.

What is claimed is:

1. A method of managing data in a computer memory, the method comprising:
    (a) storing a plurality of data objects in an object heap, wherein the data objects are accessed responsive to a computer program;
    (b) determining during at least one of compilation and loading of the computer program that an access relationship exists between first and second data objects among the plurality of data objects; and
    (c) arranging the first and second data objects in the object heap during execution of the computer program based upon the access relationship therebetween to reduce a likelihood that memory swapping will be required when at least one of the first and second data objects is accessed.

2. The method of claim 1, wherein determining that the access relationship exists between the first and second data objects includes determining a likely temporal proximity between accesses to the first and second data objects.

3. The method of claim 2, wherein determining that the access relationship exists between the first and second data objects includes determining that the first and second data objects are likely to be accessed one after another.

4. The method of claim 1, wherein determining that the access relationship exists between the first and second data objects includes determining relative frequencies of access for the first and second data objects.

5. The method of claim 1, wherein determining that the access relationship exists between the first and second data objects includes simulating execution of at least a portion of the computer program to generate profiled access information therefor.

6. The method of claim 5, wherein the profiled access information includes an access order tree representing an access order for the first and second data objects.

7. The method of claim 6, wherein the profiled access information further includes an access count for each of the first and second data objects.

8. The method of claim 5, further comprising associating the profiled access information with the computer program.

9. The method of claim 8, wherein associating the profiled access information with the computer program includes storing the profiled access information in the same file as executable code for the computer program.

10. The method of claim 1, wherein storing the plurality of data objects in the object heap includes allocating space in the object heap for each data object.

11. A method of managing data in a computer memory, the method comprising:
    (a) storing a plurality of data objects in an object heap; and
    (b) arranging at least first and second data objects in the object heap based upon an access relationship therebetween to reduce a likelihood that memory swapping will be required when at least one of the first and second data objects is accessed;
    wherein the first and second data objects are among a plurality of data objects, and wherein arranging at least the first and second data objects in the object heap based upon the access relationship therebetween includes grouping a subset of data objects together into an object group in the object heap based upon an access relationship between each data object in the subset of data objects.

12. The method of claim 11, wherein grouping the subset of data objects together includes storing the data objects in the subset of data objects in a contiguous segment of memory.

13. The method of claim 12, further comprising arranging the data objects within the object group based at least in part upon their relative frequencies of access.

14. The method of claim 12, further comprising arranging the data objects within the object group based at least in part upon an order in which the data objects are likely to be accessed.

15. A method of managing data in a computer memory, the method comprising:
    (a) storing a plurality of data objects in an object heap; and
    (b) arranging at least first and second data objects in the object heap based upon an access relationship therebetween to reduce a likelihood that memory swapping will be required when at least one of the first and second data objects is accessed;
    wherein storing the plurality of data objects in the object heap includes allocating space in the object heap for each data object, and wherein the object heap is partitioned into From and To partitions, wherein storing the plurality of data objects in the object heap includes dynamically storing the first and second data objects in the From partition during execution of a computer program, and wherein arranging the first and second data objects in the object heap includes copying the first and second data objects from the From partition to the To partition in a predetermined order based upon the access relationship therebetween.

16. The method of claim 15, wherein arranging the first and second data objects in the object heap is performed from time to time by a garbage collector, the method further comprising swapping the From and To partitions after arrangement of the first and second data objects in the object heap.

17. The method of claim 15, wherein the data objects are accessed responsive to execution of a Java class file by a Java virtual machine.

18. The method of claim 17, wherein the first and second data objects are referenced one after the other in an access chain on a call stack in the Java virtual machine, and wherein arranging the first and second data objects in the object heap includes arranging the first and second data objects next to one another in a contiguous segment of memory in response to determining that the first and second data objects are referenced one after another.

19. The method of claim 17, wherein the first and second data objects are referenced by a third data object defined in a class file, the method further comprising arranging within the class file a first reference to the first data object and a second reference to the second data object based upon an access relationship between the first and second data objects.

20. A method of managing data in a computer memory, the method comprising:
 (a) determining a relative frequency of access for each of a plurality of referenced data objects that are referenced by a referencing data object; and
 (b) arranging the plurality of referenced data objects in an object heap based upon the relative frequencies of access therefor to reduce a likelihood that memory swapping will be required when a plurality of referenced data objects is accessed.

21. An apparatus, comprising:
 (a) a memory;
 (b) an object heap, resident in the memory, the object heap configured to store a plurality of data objects; and
 (c) a program, resident in the memory, the program configured to arrange at least first and second data objects in the object heap based upon an access relationship therebetween to reduce a likelihood that memory swapping will be required when at least one of the first and second data objects is accessed, wherein the program is further configured to determine that the access relationship exists between the first and second data objects by determining relative frequencies of access for the first and second data objects.

22. The apparatus of claim 21, wherein the program is further configured to determine that the access relationship exists between the first and second data objects by additionally determining a likely temporal proximity between accesses to the first and second data objects.

23. The apparatus of claim 21, wherein the program includes a first program configured to simulate execution of at least a portion of a second program to generate profiled access information for the second program.

24. The apparatus of claim 23, wherein the first program is further configured to store the profiled access information in the same file as executable code for the second program.

25. The apparatus of claim 21, wherein the first and second data objects are among a plurality of data objects, and wherein the program is further configured to group a subset of data objects together into an contiguous segment of memory in the object heap based upon an access relationship between each data object in the subset of data objects.

26. The apparatus of claim 25, wherein the program is further configured to arrange the data objects within the object group based at least in part upon at least one of relative frequencies of access for the data objects in the object group and an order in which the data objects in the object group are likely to be accessed.

27. The apparatus of claim 21, wherein the object heap is partitioned into From and To partitions, and wherein the program is configured to copy data objects from the From partition to the To partition in a predetermined order based upon the access relationship therebetween.

28. The apparatus of claim 21, wherein the data objects are accessed responsive to execution of a Java class file by a Java virtual machine.

29. A program product, comprising:
 (a) a program configured to arrange at least first and second data objects from a plurality of objects stored in an object heap based upon an access relationship therebetween to reduce a likelihood that memory swapping will be required when at least one of the first and second data objects is accessed, wherein the program is configured to determine the access relationship by accessing profiled access information for a second program that accesses the first and second objects, wherein the profiled access information is generated prior to execution of the second program; and
 (b) a signal bearing media bearing the program.

30. The program product of claim 29, wherein the signal bearing media comprises at least one of a recordable media and a transmission-type media.

* * * * *